United States Patent
Nakazawa et al.

(10) Patent No.: US 7,428,096 B2
(45) Date of Patent: Sep. 23, 2008

(54) OPTICAL PULSE COMPRESSOR, OPTICAL FUNCTION GENERATOR, OPTICAL PULSE COMPRESSION METHOD, AND OPTICAL FUNCTION GENERATION METHOD

(75) Inventors: Masataka Nakazawa, Sendai (JP); Toshihiko Hirooka, Sendai (JP)

(73) Assignee: Japan Science and Technology Agency (JP)

( * ) Notice: Subject to any disclaimer, the term of this patent is extended or adjusted under 35 U.S.C. 154(b) by 120 days.

(21) Appl. No.: 10/553,649

(22) PCT Filed: Mar. 23, 2004

(86) PCT No.: PCT/JP2004/003937

§ 371 (c)(1),
(2), (4) Date: Aug. 14, 2006

(87) PCT Pub. No.: WO2004/092810

PCT Pub. Date: Oct. 28, 2004

(65) Prior Publication Data

US 2007/0025728 A1    Feb. 1, 2007

(30) Foreign Application Priority Data

Apr. 15, 2003    (JP) .............................. 2003-109708

(51) Int. Cl.
*G02F 1/35* (2006.01)
*G02F 2/02* (2006.01)

(52) U.S. Cl. ........................ 359/326; 359/238; 359/245; 398/81; 398/147

(58) Field of Classification Search ................. 359/238, 359/245, 326–332; 398/81, 85, 101, 147
See application file for complete search history.

(56) References Cited

U.S. PATENT DOCUMENTS 5,982,530 A * 11/1999 Akiyama et al. ............ 359/279
6,870,663 B2 * 3/2005 Kato et al. .................. 359/326
7,352,504 B2 * 4/2008 Hirooka et al. ............. 359/327

FOREIGN PATENT DOCUMENTS

JP    11-112425 A    5/1995
JP    09-061765 A    7/1997

OTHER PUBLICATIONS

Compression of optical pulses chirped by self-phase modulation in fibers W.J. Tomlinson, R.H. Stolen, and C.V. Shank, Apr. 2, 1984.

(Continued)

*Primary Examiner*—Sung Pak
*Assistant Examiner*—Daniel Petkovsek
(74) *Attorney, Agent, or Firm*—Lowe Hauptman Ham & Berner, LLP

(57) ABSTRACT

A small-sized, high-functionality optical pulse compressor capable of generating a low-power, high-repetition-frequency ultrashort pulse train used for ultrafast optical communication and photometry, and a simple-structure optical function generator for realizing an arbitrary time waveform. The optical pulse compressor comprises and optical Fourier transform device (F) having an optical phase modulator (9) driven by the repetition-frequency of an input optical pulse train and a dispersive medium (8), for converting the shape of an input optical pulse frequency spectrum into its time waveform, and an optical filter (3) inserted ahead of the optical Fourier transform device (F), for reducing the spectrum width of an input optical pulse, wherein the optical Fourier transform device (F) converts a small-spectrum-width optical pulse output from the optical function generator generates an optical pulse. The optical function generator generates an optical pulse having an arbitrary time waveform by reproducing, as it is, a spectrum waveform-shaped arbitrarily by an optical filter on a time-axis by the optical Fourier transform device (F).

7 Claims, 10 Drawing Sheets

OTHER PUBLICATIONS

High energy, sub-picosecond pulse compression at 10GHz using a fibre/fibre-grating pulse compressor K. Tamura, T. Komukai, T. Yamamoto, T. Imai, E. Yoshida and M. Nakazawa Electronic Letters Dec. 7, 1995 vol. 31 No. 25.

Picosecond Solition Pulse Compressor Based on Dispersion Decreasing Fibre S. V. Chernikov, D.J. Richardson, E.M. Dianov and D. N. Payne Electronic Letters Sep. 10, 1992, vol. 28, No. 19.

High Resolution femtosecond pulse shaping A. M. Weiner, J.P. Heritage, and E.M. Kirschner Bell Communication Research vol. 5, No. 8/Aug. 1998/J.Opt.Soc. Am. B.

Fabrication of frequency spectrum synthesister consisting of arrayed-waveguide grating pair and thermo-optic amplitude and phase controllers K. Okamoto, T. Kominato, H. Yamada and T. Goh Electronics Letters Apr. 29, 1999, vol. 35, No. 9.

M. Romagnoli et al., Time-domain Fourier optics for polarizat ion-mode dispersion compensation, Optics Letters, vol. 24, No. 17 (Sep. 1999), pp. 1197 to 1199.

Leaf A. Jiang et al., "Timing Jitter eater for optical pulse trains", Optics Letters, vol. 28, No. 2 Jan. 2003, pp. 78 to 80.

* cited by examiner (a) $\Omega_f$=447 rad-GHz (b) $\Omega_f$=258 rad-GHz (c) $\Omega_f$=200 rad-GHz (a) $\Omega_f$=447 rad-GHz (b) $\Omega_f$=258 rad-GHz (c) $\Omega_f$=200 rad-GHz

OPTICAL PULSE COMPRESSOR, OPTICAL FUNCTION GENERATOR, OPTICAL PULSE COMPRESSION METHOD, AND OPTICAL FUNCTION GENERATION METHOD

TECHNICAL FIELD

The present invention relates to optical pulse compressors for compressing the time width of an optical pulse output from a optical pulse source at a desired rate and optical function generators for providing a desired pulse waveform, in the ultrashort pulse technology used for ultra-high speed optical communication and optical measurement.

BACKGROUND ART

General optical pulse compression technology can be broadly divided into a pulse compression technique using an optical fiber and a pair of diffraction gratings (first conventional technique) and a pulse compression technique based on soliton effect using a dispersion-decreasing fiber (second conventional technique).

When a strong optical pulse is launched into a fiber, the first conventional technique converts the pulse into a broadband rectangular pulse having a linear chirp by normal dispersion and non-linearity (self-phase modulation effect) of the fiber. Then, the linearly chirped pulse is dispersion-compensated through anomalous dispersion realized artificially by the pair of diffraction gratings, and the width of the input pulse is greatly reduced (non-patent documents 1 and 2). Non-patent document 2 reports an example of compressing an optical pulse train having a repetition frequency of 10 GHz and a pulse width of 7.1 ps to 720 fs at a wavelength of 1548 nm.

The second conventional technique compresses a soliton pulse width by decreasing the anomalous dispersion value of the fiber adiabatically while maintaining the soliton property along the direction of propagation (by changing the dispersion gradually). The principle used here is that a soliton keeps a constant level of energy by automatically varying the pulse width with a change in dispersion (non-patent documents 3 and 4). Non-patent document 4 reports an example of compressing, with the use of a dispersion-decreasing fiber, an optical pulse train having a repetition frequency of 10 GHz and a pulse width of 3 ps to 170 fs at a wavelength of 1550 nm.

Conventional optical function generators and optical pulse shapers (third conventional technique) use a lens and a diffraction grating or an arrayed waveguide grating to change the amplitude and phase of each frequency component of the pulse independently (non-patent documents 5 and 6). Letting the input time waveform be u(t) and its spectrum be U(ω), the output time waveform be v(t) and its spectrum be V(ω), and the transfer function of pulse shaping in the time domain be g(t) and the transfer function of pulse shaping on the spectrum be G(ω), the relationship in the frequency domain can be expressed as follows:

$$V(\omega) = G(\omega)U(\omega)$$

The relationship in the time domain can be expressed as follows:

$$v(t) = \int_{-\infty}^{1} g(t-\tau)u(\tau)d\tau$$

Non-patent Document 1

W. J. Tomlinson, R. J. Stolen, and C. V. Shank, "Compression of optical pulses chirped by self-phase modulation in fibers," J. Opt. Soc. Am. B, Vol. 1, pp. 139-149, 1984

Non-patent Document 2

K. Tamura, T. Komukai, T. Yamamoto, T. Imai, E. Yoshida, and M. Nakazawa, "High energy, sub-picosecond pulse compression at 10 GHz using a fiber/fiber-grating pulse compressor," Electron. Lett. Vol. 31, pp. 2194-2195, 1995

Non-patent Document 3

S. V. Chernikov, D. J. Richardson, E. M. Dianov, and D. N. Payne, "Picosecond soliton pulse compressor based on dispersion decreasing fiber," Electron. Lett. Vol. 28, pp. 1842-1844, 1992

Non-patent Document 4

M. Nakazawa, E. Yoshida, K. Kubota, and Y. Kimura, "Generation of 170 fs, 10 GHz transform-limited pulse train at 1.55 µm using a dispersion-decreasing, erbium-doped active soliton compressor," Electron. Lett. Vol. 30, pp. 2038-2040, 1994

Non-patent Document 5

A. M. Weiner, J. P. Heritage, and E. M. Kirschner, "High-resolution femtosecond pulse shaping," J. Opt. Soc. Am. B, Vol. 5, pp. 1563-1572, 1988

Non-patent Document 6

K. Okamoto, T. Kominato, H. Yamada, and T. Goh, "Fabrication of frequency spectrum synthesizer consisting of arrayed-waveguide grating pair and thermo-optic amplitude and phase controllers," Electron. Lett. Vol. 35, pp. 733-734, 1999

DISCLOSURE OF INVENTION

In pulse compression of the first conventional technique, utilizing a fiber and a pair of diffraction gratings, the pulse compression ratio depends on the magnitude of phase modulation induced by a pulse. Accordingly, the compression rate can be enhanced by generating a linearly chirped pulse with a wide spectrum through self-phase modulation and normal dispersion in a fiber. This technique is generally effective in generating a high-power ultrashort pulse in the visible region or the near-infrared region, where the fiber exhibits normal dispersion. The general low-power optical pulse used in ultra-high speed optical communication, however, cannot acquire large amount of chirp, and the compression ratio is limited. A great compression ratio will require a great amount of dispersion to compensate for the chirp, but the third-order dispersion and the like have such a significant influence that the waveform of the pulse to be compressed is distorted.

In pulse compression of the second conventional technique, utilizing a dispersion-decreasing fiber, the soliton effect is used, so that the pulse width or the peak power must be accurately adjusted to meet the soliton conditions. Adiabatic soliton compression generally requires a dispersion-decreasing fiber of 100 meters to several kilometers long. An increased compression rate will increase the spectrum bandwidth. Because it is difficult to create a dispersion-decreasing fiber having uniform dispersion characteristics across a wide band, this pulse compression method would be expensive.

In optical pulse shaping of the third compression technique, where the amplitude or phase processing is carried out on the frequency components, the frequency characteristics of the transfer function shape the spectrum and phase of the pulse. Accordingly, this method is just a frequency spectrum synthesis or a waveform synthesis of different frequency and phase components. For instance, a rectangular waveform can be obtained by giving the frequency characteristics of the sinc function, which is the Fourier transform of a rectangular wave, to the transfer function. Conventional optical pulse shapers must perform complicated processing of each spectrum in the frequency domain in order to implement a simple time waveform.

Accordingly, it is an object of the present invention to provide a compact, highly-functional optical pulse compressor that can generate a train of low-power, high-repetition-frequency ultrashort pulses for use in ultra-high speed optical communication or optical measurement, and a simple optical function generator that can implement a desired time waveform.

According to the first solving means of this invention, there is provided an optical pulse compressor comprising:

an optical Fourier transform circuit for converting the shape of the frequency spectrum of an input optical pulse to a time waveform, the optical Fourier transform circuit having an optical phase modulator driven at the repetition frequency of the input optical pulse train and a dispersive medium; and an narrow-band optical filter for narrowing the spectrum width of the input optical pulse, the narrow-band optical filter being inserted before the optical Fourier transform circuit, wherein the optical Fourier transform circuit converts an optical pulse having a narrow spectrum width output from the narrow-band optical filter to an optical pulse having a narrow time width.

According to the second solving means of this invention, there is provided an optical function generator comprising:

an optical pulse generator for generating an optical pulse train;

an optical Fourier transform circuit for converting the shape of the frequency spectrum of the optical pulse input from the optical pulse generator to a time waveform, the optical Fourier transform circuit having an optical phase modulator driven at the repetition frequency of the input optical pulse train from the optical pulse generator and a dispersive medium; and an optical filter for shaping the spectrum of the input optical pulse, the optical filter being inserted before the optical Fourier transform circuit, wherein the optical Fourier transform circuit generates an optical pulse having a desired time waveform, by reproducing, directly on the time axis, the spectrum shaped as desired by the optical filter.

According to the third solving means of this invention, there is provided an optical pulse compression method using an optical pulse compressor comprising an optical Fourier transform circuit and a narrow-band optical filter, the optical Fourier transform circuit having an optical phase modulator and a dispersive medium, the optical pulse compression method comprising that:

narrowing the spectrum width of an input optical pulse by inserting the narrow-band optical filter before the optical Fourier transform circuit;

driving the optical phase modulator at the repetition frequency of the input optical pulse train; and converting the optical pulse having a narrow spectrum width output from the narrow-band optical filter to an optical pulse having a narrow time width, by means of the optical Fourier transform circuit.

According to the fourth solving means of this invention, there is provided an optical function generation method using an optical function generator comprising an optical pulse generator, an optical Fourier transform circuit, and an optical filter, the optical Fourier transform circuit having an optical phase modulator and a dispersive medium, the optical function generation method comprising that:

shaping the spectrum of an input optical pulse input from the optical pulse generator, by inserting the optical filter before the optical Fourier transform circuit;

driving the optical phase modulator at the repetition frequency of the input optical pulse train; and generating an optical pulse having a desired time waveform, by reproducing, directly in the time domain, the spectrum shaped as desired by the optical filter, by means of the optical Fourier transform circuit.

ADVANTAGES

The present invention enables efficient compression of a train of low-power, high-repetition-frequency pulses in the optical communication wavelength range and can implement a practical, economical, and high-quality short optical pulse source for ultra-high speed optical communication. In addition, a pulse train having a desired time waveform can be easily generated, depending on the amplitude characteristics and phase characteristics of an optical filter, so that a highly-functional optical synthesizer for optical measurement or optical signal processing can be implemented.

BEST MODE FOR CARRYING OUT THE INVENTION

Embodiments of the present invention will be described below with reference to the drawings.

A. First Embodiment

Figure 1:
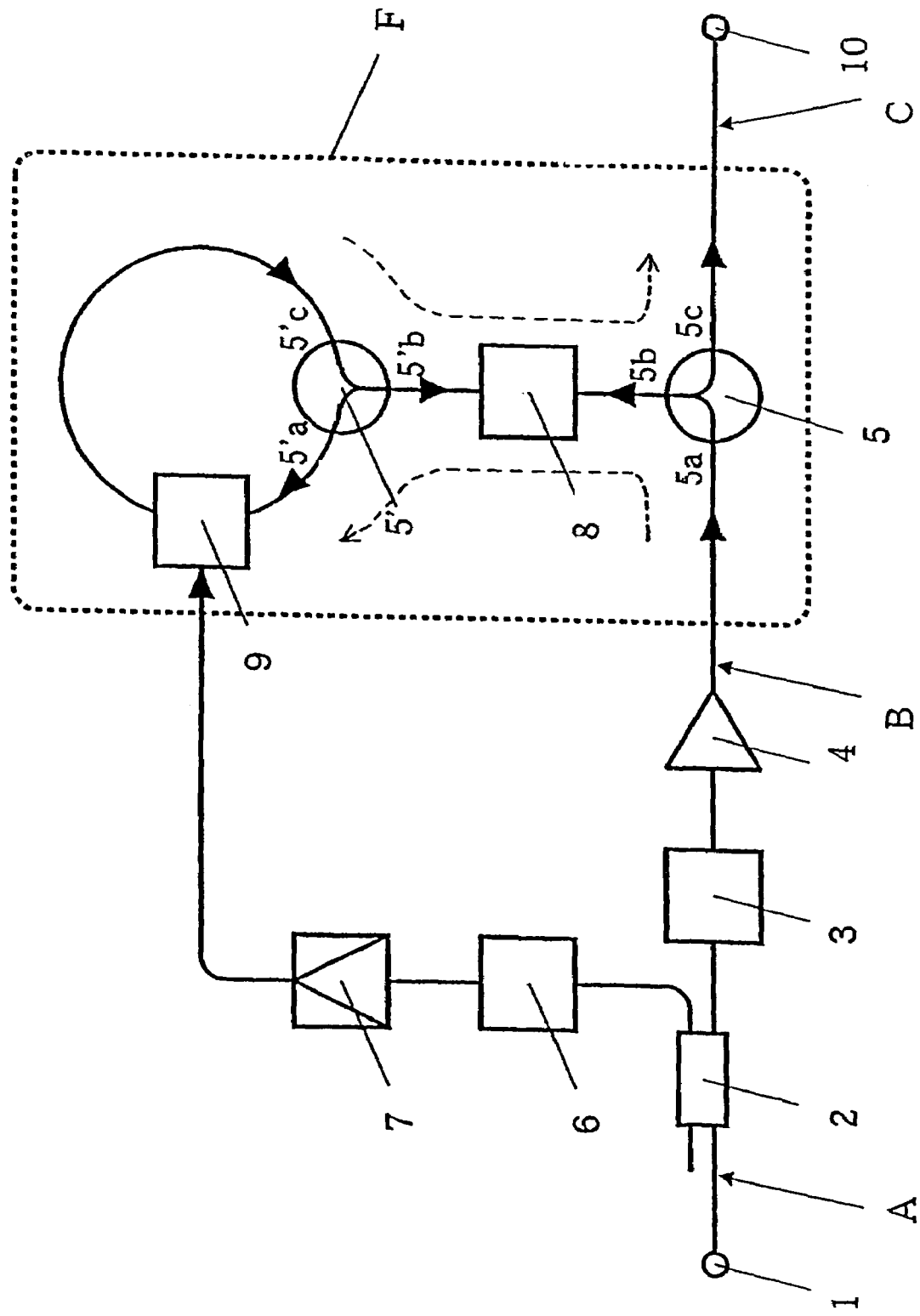
FIG. 1 is an illustrative view showing an optical pulse compressor of a first embodiment of the present invention.

FIG. 1 is a view showing the configuration of an optical pulse compressor of a first embodiment. The optical compressor includes an optical input terminal 1, an optical coupler 2, an optical narrow-band filter 3, an optical amplifier 4, optical circulators 5 and 5', a clock extraction circuit 6, an electric amplifier 7, a dispersive medium 8, an optical phase modulator 9, and an optical output terminal 10.

The optical input terminal 1 is connected through the optical coupler 2, the optical narrow-band filter 3, and the optical amplifier 4 to a port 5a of the optical circulator 5. The port 5a of the optical circulator 5 is connected through a port 5b, the dispersive medium 8, and a port 5'b of the optical circulator 5' to a port 5'a. The ports 5'a and 5'c of the optical circulator 5' are connected in a loop passing the optical phase modulator 9. The port 5b of the optical circulator 5 is connected through a port 5c to the optical output terminal 10. The flow of a signal is represented by broken lines in the figure. The optical coupler 2 is connected through the clock extraction circuit 6 and the electric amplifier 7 to a drive circuit of the optical phase modulator 9. The optical circulators 5 and 5', the dispersive medium 8, and the optical phase modulator 9 are included in an optical Fourier transform circuit F.

The optical Fourier transform circuit F receives an optical pulse and performs an optical Fourier transform from a spectrum in the frequency domain to a pulse waveform in the time domain.

The optical phase modulator 9 is preferably a phase modulator utilizing the electrooptic effect such as $LiNbO_3$, for instance. The optical phase modulator 9 may also use the phase modulation effect of EA (electro-absorption) or SOA (semiconductor optical amplifier). Generally, many phase modulators have polarization dependency, but the optical phase modulator 9 may be a polarization-independent optical device or may eliminate the polarization dependency by a polarization diversity method.

A phase shifter and a optical delay fiber may be provided to apply phase modulation to the optical pulse at an optimum timing. If the timing of modulation varies with temperature or another factor, the phase shifter can automatically adjust the phase shift amount to apply optimum modulation. An electric amplifier may also be provided to output a drive signal for driving the optical phase modulator 9 in accordance with the output of the phase shifter.

The dispersive medium 8 can be a fiber Bragg grating, a pair of diffraction gratings, or a single-mode optical fiber having such group velocity dispersion characteristics that a zero-dispersion region exists near the 1.3-μm wavelength range.

Figure 2:
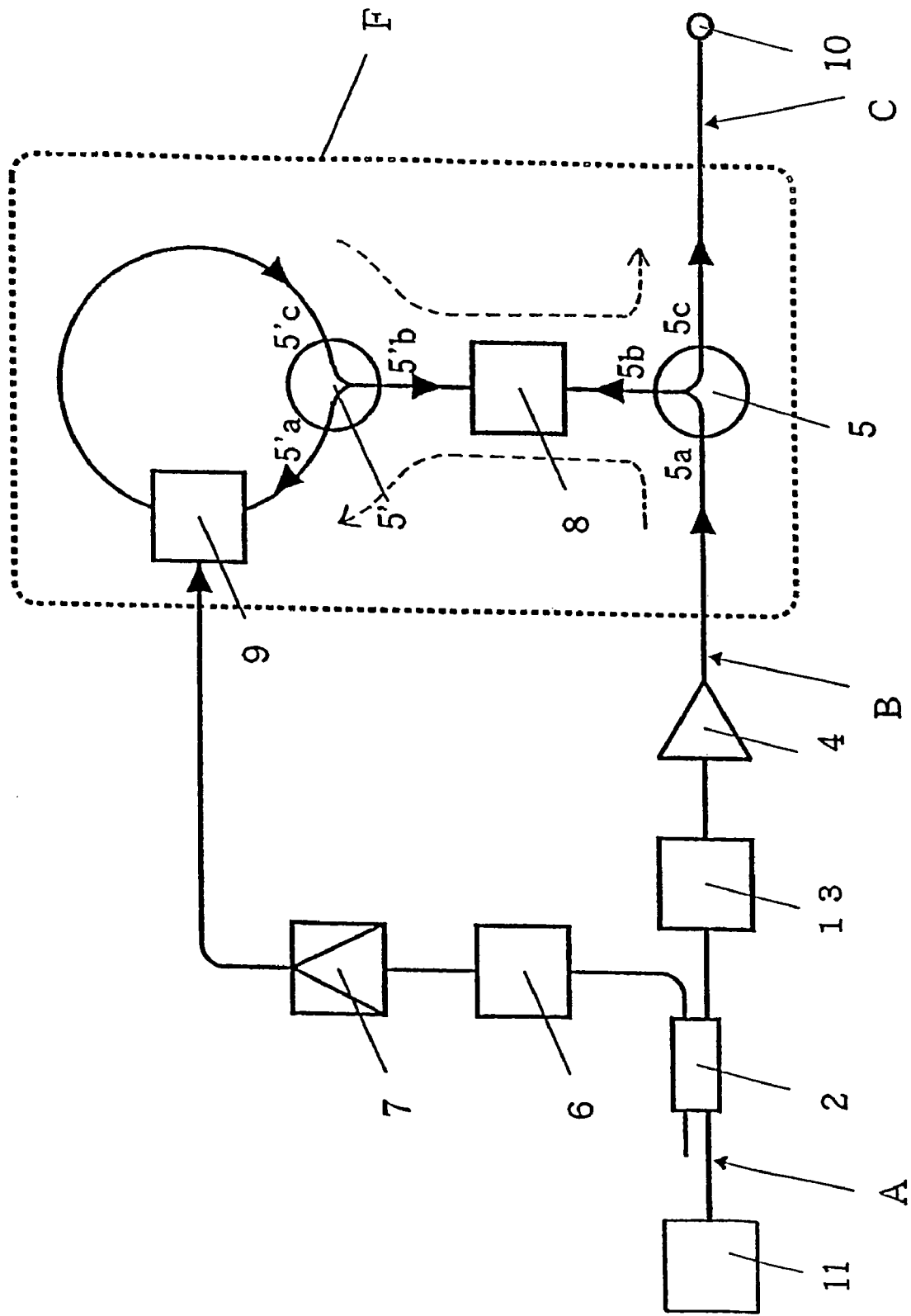
FIG. 2 is an illustrative view showing an optical function generator of the first embodiment of the present invention.

FIG. 2 is a view showing the configuration of an optical function generator of a first embodiment. Like the optical pulse compressor, the optical function generator includes an optical coupler 2, an optical filter 13, an optical amplifier 4, optical circulators 5 and 5', a clock extraction circuit 6, an electric amplifier 7, a dispersive medium 8, an optical phase modulator 9, and an optical output terminal 10. In addition, an optical pulse generator 11 is included. The optical pulse compressor uses the optical narrow-band filter 3 for narrowing the spectrum width of the input optical pulse while the optical function generator uses the optical filter 13 having (appropriate) amplitude characteristics and phase characteristics predetermined for shaping the spectrum of an incoming optical pulse. The components having the same reference numerals as in the optical pulse compressor are configured and operate as described earlier.

The optical pulse generator 11 generates an optical pulse train. The optical pulse generator 11 outputs, for instance, an optical pulse train generated by a laser or another light source to the optical coupler 2. The optical function generator can generate desired output waveforms by appropriately specifying the waveform of the optical pulse generated by the optical pulse generator 11, the characteristics of the optical narrow-band filter 3, and the like.

A general operation of the optical pulse compressor and the optical function generator will be described.

The optical input terminal 1 of the optical pulse compressor receives an optical pulse train while the optical pulse generator 11 of the optical function generator generates an optical pulse train. The subsequent part of the operation is common to the optical pulse compressor and the optical function generator. The input optical pulse train passes through the optical coupler 2, and the clock signal (sinusoidal signal) of the optical pulse train is reproduced in advance by the clock extraction circuit 6 and the electric amplifier 7. Each pulse of the optical pulse train meets the Fourier transform-limit conditions. A transform-limited pulse here has a just enough spectrum width for the time waveform. For instance, a Gaussian pulse satisfies the condition of $\Delta v \Delta \tau \cong 0.441$, where $\Delta \tau$ is the width of the time pulse and $\Delta v$ is the spectrum width. The optical pulse train is next input to the optical narrow-band filter 3 in the optical pulse compressor or to the optical filter 13 in the optical function generator, and then amplified by the optical amplifier 4 having an appropriate gain for maintaining the same level of energy before and after the filter. The amplitude characteristics and phase characteristics of the optical narrow-band filter 3 or the optical filter 13 determine the time waveform of the output pulse obtained through an optical Fourier transform performed by the optical Fourier transform circuit F. The amplified optical pulse passes through the ports 5a and 5b of the optical circulator 5 and enters the dispersive medium 8, where group-velocity dispersion is applied to the optical pulse. The group-velocity dispersion causes the individual frequency components of the time waveform of the optical pulse to have different time delays. Accordingly, different time shifts are assigned to the individual frequency components of the spectrum of the optical pulse. The optical pulse subjected to group-velocity dispersion passes through the ports 5'b and 5'a of the optical circulator 5' and enters the optical phase modulator 9, which is driven at the clock frequency reproduced from the optical pulse train. The optical phase modulator 9 linearly chirps the optical pulse. Now, the time waveform of the optical pulse is frequency-shifted, and different frequencies are assigned to individual time positions. Different frequency shifts are given to the spectrum of the optical pulse depending on the time shifts, and different time components are divided in the frequency domain. Accordingly, the frequency components of the optical pulse are divided in the time domain. A Fourier transform image $U(\omega)$ of the time waveform $u(t)$ is generated at B in FIGS. 1 and 2, which will be described later, by setting the chirp rate K of the optical phase modulator 9 to 1/D, where D is the dispersion amount of the dispersive medium 8. The optical pulse passes through the ports 5'c and 5'b and enters the dispersive medium 8 again, and the remaining chirp is compensated for. Then, the optical pulse is output through the ports 5b and 5c of the optical circulator 5 and the optical output terminal 10 to the outside.

The operation of the optical Fourier transform circuit F, which plays a dominant role in the present invention, will next be described in further detail.

Figure 3:
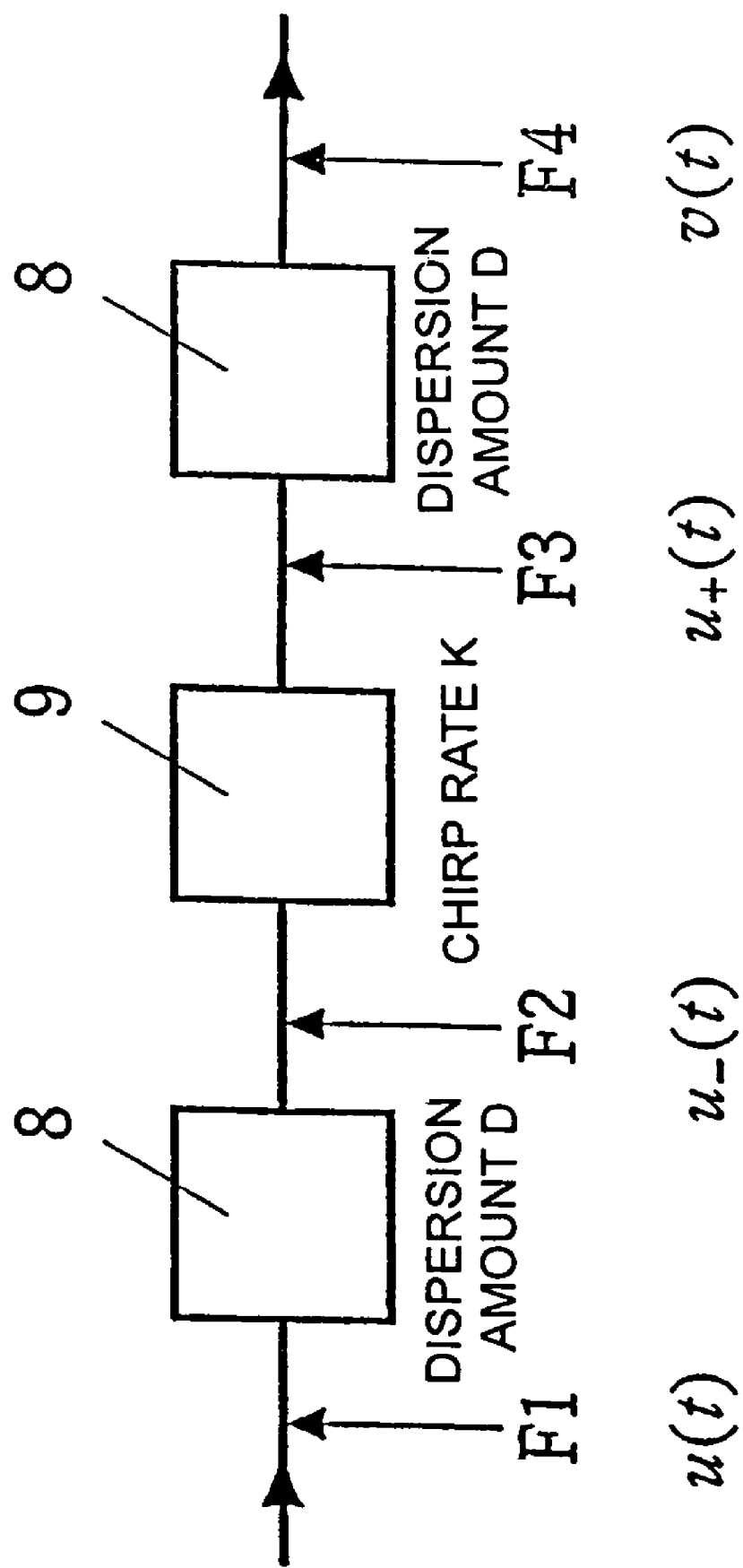
FIG. 3 is an illustrative view showing a configuration of an optical Fourier transform circuit F in FIGS. 1 and 2.

FIG. 3 is a sketch illustrating the optical Fourier transform circuit F. The operation in the first embodiment will be described, with regard to each pulse included in the optical pulse train input to the optical Fourier transform circuit 3. The time waveforms at F1, F2, F3, and F4 in the figure are denoted as u(t), u_(t), u_+(t), and v(t) respectively. The dispersion amount of the dispersive medium 8 is denoted as D, and the chirp rate of the optical phase modulator 9 is denoted as K. If the dispersive medium 8 is an optical fiber having a length L and second-order dispersion k", the dispersion amount D equals k"L. The phase modulation characteristics of the optical phase modulator 9 are given by $\exp(iKt^2/2)$.

The relationship between the input pulse waveform u(t) and the output pulse waveform v(t) of the optical Fourier transform circuit F is obtained as follows. The output pulse u_(t) of the dispersive medium 8 preceding the optical phase modulator 9 is obtained by a convolutional integration of the input pulse u(t), as expressed below.

$$u_-(t) = \frac{1}{\sqrt{2\pi i D}} \int_{-\infty}^{\infty} u(t') \exp\left(-\frac{i}{2D}(t-t')^2\right) dt' \quad (1)$$

The relationship between the signal u_(t) before the optical phase modulator 9 and the signal u_+(t) after the optical phase modulator 9 is expressed as follows:

$$u_+(t) = u_-(t)\exp(iKt^2/2) \quad (2)$$

The output pulse v(t) of the dispersive medium 8, which the optical pulse passes again after the optical phase modulator 9, is given by an expression similar to the expression (1), using the input pulse u_+(t):

$$v(t) = \frac{1}{\sqrt{2\pi i D}} \int_{-\infty}^{\infty} u_+(t') \exp\left(-\frac{i}{2D}(t-t')^2\right) dt' \quad (3)$$

Therefore, the output waveform v(t) of the optical Fourier transform circuit F can be derived from the input waveform u(t), by using expressions (1) to (3) as follows:

$$v(t) = \frac{1}{\sqrt{2\pi i D}} \int_{-\infty}^{\infty} u_-(t')\exp\left(\frac{iKt'^2}{2}\right)\exp\left(-\frac{i}{2D}(t-t')^2\right) dt' \quad (4)$$

$$= \frac{1}{2\pi i D} \int_{-\infty}^{\infty} \left[\int_{-\infty}^{\infty} u(t'')\exp\left(-\frac{i}{2D}(t'-t'')^2\right) dt''\right]$$

$$\exp\left(\frac{iKt'^2}{2}\right)\exp\left(-\frac{i}{2D}(t-t')^2\right) dt'$$

When the chirp rate K of the optical phase modulator is set to 1/D, the expression (4) can be written as follows:

$$v(t) = \frac{1}{2\pi i D}\int_{-\infty}^{\infty} u(t'')\exp\left(-\frac{i}{2D}(t''^2+t^2)\right) \quad (5)$$

$$\int_{-\infty}^{\infty}\exp\left(-\frac{i}{2D}[t'^2-2(t''+t)t']\right)dt'dt''$$

$$= \frac{1}{i\sqrt{2\pi i D}}\int_{-\infty}^{\infty} u(t'')\exp\left(\frac{it}{D}t''\right)dt''$$

$$= \frac{1}{i\sqrt{2\pi i D}} U(t/D)$$

where U(ω) [ω=t/D] is a Fourier transform of u(t) expressed by the following:

$$U(\omega) = \int_{-\infty}^{\infty} u(t'')\exp(i\omega t'')dt'' \quad (6)$$

Accordingly, the output time waveform v(t) of the optical Fourier transform circuit F corresponds to the shape of the spectrum of the input waveform of the optical Fourier transform circuit F when the scale in the time domain is converted to t/D=ω.

The shaping of the optical pulse waveform in the configurations shown in FIGS. 1 and 2 will next be described in further detail, with reference to drawings.

Figure 4:
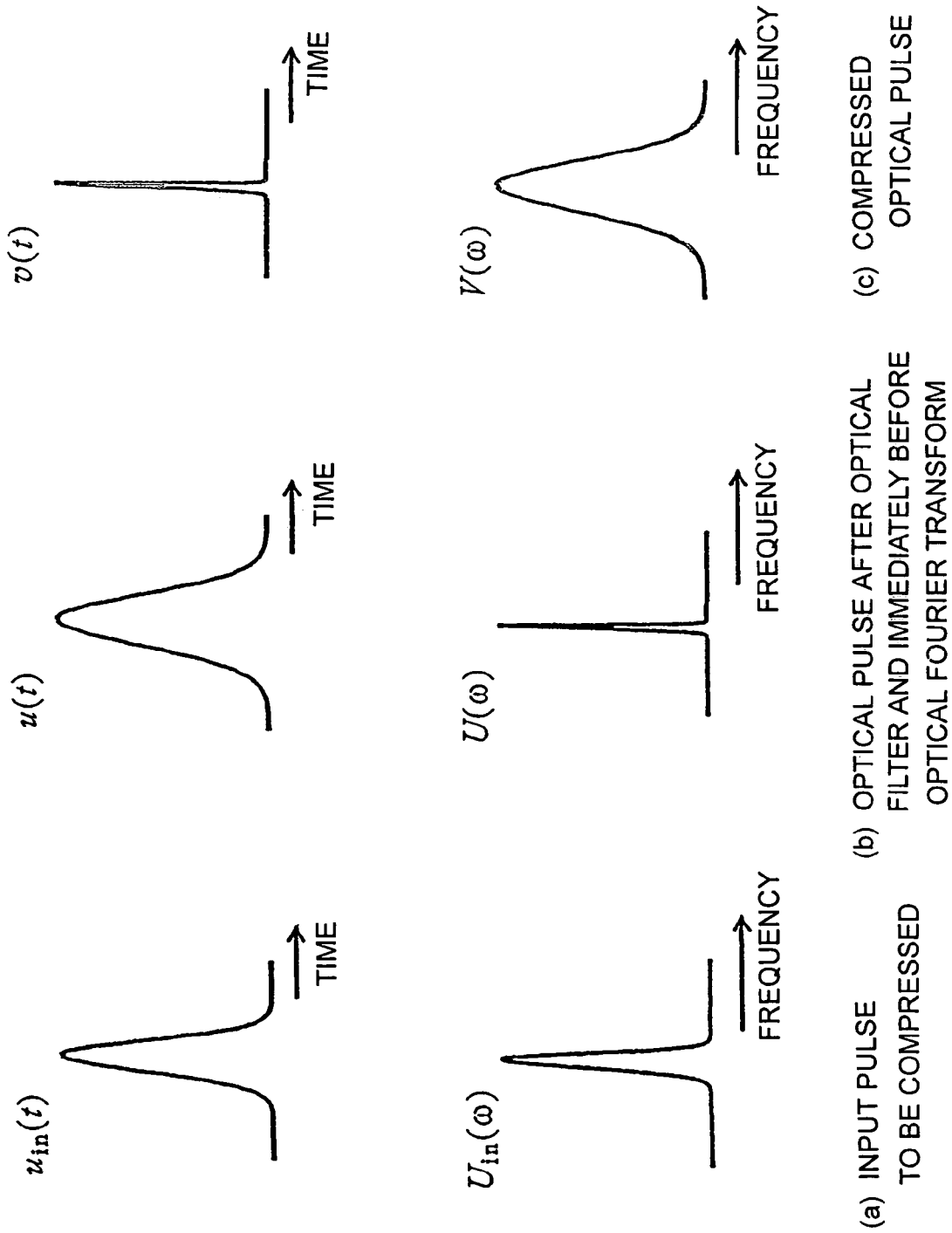
FIG. 4 shows sketches of the time waveforms and spectrums of an optical pulse at A, B, and C in FIGS. 1 and 2.

FIG. 4 shows sketches of time waveforms of an optical pulse and their spectrums. FIGS. 4(a), 4(b), and 4(c) are sketches of the time waveforms and spectrums of the optical pulse at A, B, and C respectively in FIGS. 1 and 2. Letting the time waveform of the optical pulse input from the optical input terminal 1 (at A in FIGS. 1 and 2) be $u_{in}(t)$ and its spectrum be $U_{in}(\omega)$, and the time waveform after the optical narrow-band filter 3 or the optical filter 13 having a transfer function G(ω) (at B in FIGS. 1 and 2) be u(t) and its spectrum be U(ω), the following expression is satisfied:

$$U(\omega) = G(\omega)U_{in}(\omega) \quad (7)$$

When the optical pulse at B in FIGS. 1 and 2 is input to the optical Fourier transform circuit F, the time waveform v(t) of the output signal of the optical Fourier transform circuit F at C in FIGS. 1 and 2 is proportional to the spectrum U(ω) of the input signal, as given by the expression (5). The expressions (5) and (7) give the following expression:

$$v(t) = \frac{1}{i\sqrt{2\pi i D}} G(t/D)U_{in}(t/D) \quad (8)$$

The expression (8) indicates that the spectrum U(ω) shaped according to the amplitude characteristics G(ω) of the optical narrow-band filter 3 or the optical filter 13 appears in the output time waveform v(t) as $G(\omega)U_{in}(\omega)$. Accordingly, a desired time waveform $G(t)U_{in}(t)$ depending on the filter shape can be implemented.

Supposing that the input signal has a Gaussian waveform, a method of implementing pulse compression based on the principle described above in the configuration shown in FIG. 1 will be described. When the input Gaussian pulse waveform $u_{in}(t)$ is expressed by:

$$u_{in}(t) = A\exp(-t^2/2T_0^2) \quad (9)$$

the spectrum $U_{in}(\omega)$ is obtained by the following expression:

$$U_{in}(\omega) = \sqrt{2\pi T_0^2} A\exp(-T_0^2\omega^2/2) \quad (10)$$

If the input spectrum $U_{in}(\omega)$ is Gaussian and if the optical narrow-band filter 3 has Gaussian amplitude characteristics, the frequency spectrum after the optical narrow-band filter 3 becomes Gaussian as well. Therefore, if the transfer function of the optical narrow-band filter 3 is expressed by:

$$G(\omega) = \alpha\exp(-\omega^2/2\,\Omega_f^2) \quad (11)$$

where $\Omega_f$ is the bandwidth of the optical narrow-band filter 3, the input spectrum of the optical Fourier transform circuit F at B in FIG. 1 is given by the following expression:

$$U(\omega) = \sqrt{2\pi T_0^2} A\alpha \exp[-(T_0^2+1/\Omega_f^2)\omega^2/2] \quad (12)$$

where α is a gain for compensating for the energy lost by the filter 3. Accordingly, the output waveform obtained at C in FIG. 1 is given by substituting ω=t/D and the expression (12) into the expression (5):

$$v(t) = \frac{\sqrt{KT_0^2} A\alpha}{i\sqrt{t}} \exp(-t^2/2T_1^2) \quad (13)$$

where $T_1$ is the pulse width.

The pulse width $T_1$ is given by:

$$T_1 = \frac{1}{|K|\sqrt{T_0^2 + 1/\Omega_f^2}} \quad (14)$$

If the compression is supposed to be the ratio of the input pulse width $T_0$ to the output pulse width $T_1$ of the expression (14), the compression ratio is expressed by:

$$\frac{T_0}{T_1} = |K|T_0^2 \sqrt{1 + \frac{1}{\Omega_f^2 T_0^2}} \quad (15)$$

$$\cong \frac{|K|}{\Omega_f} T_0$$

where $\Omega_f^2 T_0^2 \ll 1$. It is important here that the compression of the spectrum width by the optical narrow-band filter 3 is directly converted to the compression of the time width of the pulse by the optical Fourier transform. The pulse obtained as the output waveform has a spectrum width compressed by a factor of $(1+1/\Omega_f^2 T_0^2)^{-1/2}$ by the optical narrow-band filter 3, as given by the expression (12), and a pulse width compressed by a factor of $|K|T_0^2(1+1/\Omega_f^2 T_0^2)^{-1/2}$ by the optical Fourier transform, as given by the expression (15). The expression (15) gives such important information that an increase in chirp rate K given by the optical phase modulator 9 or a decrease in bandwidth $\Omega_f$ of the optical narrow-band filter 3 will increase the compression ratio.

Figure 5:
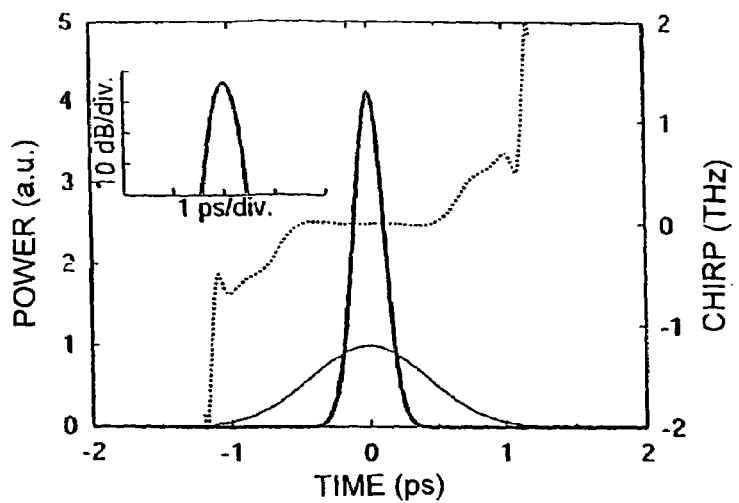
FIG. 5 is a view displaying the time waveforms of the input pulse, the time waveforms of the compressed output pulse, and the frequency chirps, of the optical pulse compressor of the first embodiment of the present invention.
Figure 5:
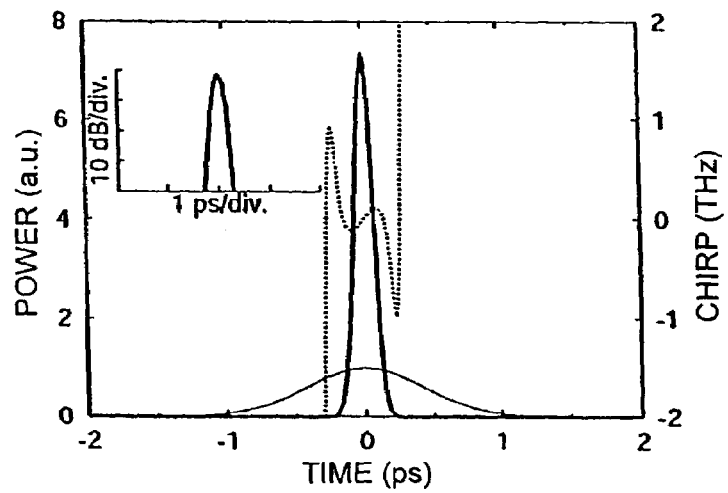
Figure 5:
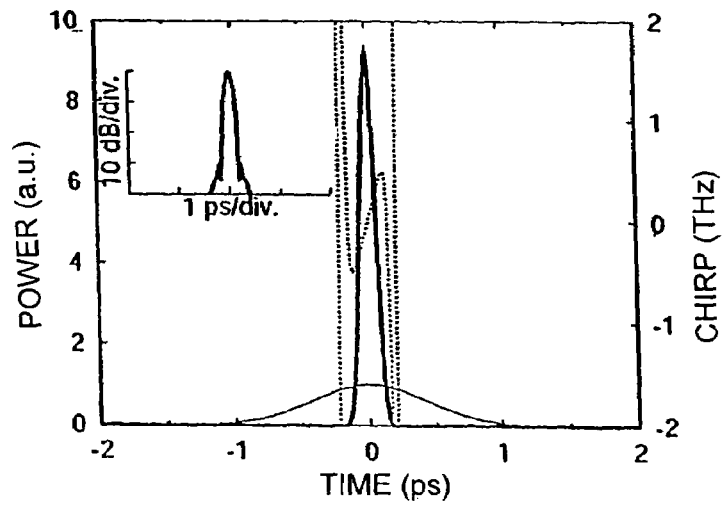

FIG. 5 shows views displaying the time waveform of the input pulse, the time waveform of the compressed output pulse, and the frequency chirp, of the optical pulse compressor of the first embodiment of the present invention. A solid line represents a time waveform, and a broken line represents a frequency chirp. The inset shows the time waveform of the output pulse on the dB scale.

The figure shows values obtained to represent the performance of pulse compression by the pulse compressor of the first embodiment, through calculation on a pulse train having a repetition frequency of 10 GHz and a pulse width of 1 ps. The time waveform of the input pulse at A in FIG. 1 is assumed to be a transform-limited Gaussian pulse (9). The relationship of the input pulse width $T_0$ and the full width at half maximum $T_{FWHM}$ is given by the following expression:

$$T_{FWHM} = 2(\ln 2)^{1/2} T_0$$

Accordingly, $T_{FWHM}$ of 1.0 ps corresponds to $T_0$ of 0.6 ps. Suppose that the frequency characteristics of the filter 3 are given by the expression (11). If the chirp rate K of the optical phase modulator 9 is $-2.77$ ps$^{-2}$, the dispersion amount D of the dispersive medium 8 equals 1/K, which equals $-0.36$ ps$^2$. If a single-mode fiber (SMF) [k"=$-20$ ps$^2$/km] is used as the dispersive medium, a required length L equals D/k", which equals 18 m. The non-linear optical effect and high-order dispersion of the SMF are ignored here. The modulation characteristics φ(t) of the optical phase modulator 9 should be given by the following combination of sinusoidal waves, so that the chirp characteristics approximated near the peak of the pulse become linear (the phase modulation characteristics are approximated by a parabola).

$$\phi(t) = A_m \left( \frac{9}{8} \cos\omega_m t - \frac{1}{72} \cos 3\omega_m t \right) \quad (16)$$

where the drive frequency $\omega_m$ of the optical phase modulator 9 synchronized with the repetition frequency of the optical pulse train and the bit interval $T_m$ of the optical pulse train have a relationship expressed by $\omega_m = 2\pi/T_m$. The expression (16) considers up to the third-order harmonics, so that φ(t) can be approximated by a parabola around the peak as far as possible.

FIGS. 5(a), 5(b), and 5(c) are views taken when the bandwidth $\Omega_f$ of the filter is 447 rad-GHz, 258 rad-GHz, and 200 rad-GHz respectively. These conditions correspond to a 3-dB bandwidth of 118.5 GHz, 68.4 GHz, and 53.0 GHz respectively, and to a bandwidth of $\Delta f_{FWHM}/3.73$, $\Delta f_{FWHM}/6.45$ and $\Delta f_{FWHM}/8.33$ respectively at a pulse spectrum width $\Delta f_{FWHM}$ of 441 GHz. In the figure, a thin solid line represents the time waveform at A in FIG. 1, a thick solid line represents the time waveform at C in FIG. 1, and a broken line represent the frequency chirp of the output waveform at C in FIG. 1. The inset shows the output time waveform at C in FIG. 1 on the dB scale.

The analyzed compression ratios of (a), (b) and (c) are 3.86, 6.41, and 7.69 respectively. These values are very close to the theoretical values (3.86, 6.54, and 8.40) given by the expression (15). The time bandwidth products (TBPs) of the obtained pulse are 0.441, 0.451, and 0.484 respectively. When the filter has a narrow band, the output waveform has a uniquely broadened bottom. An increase in TBP results from the Fourier transform not being accurately performed at the bottom of the pulse because the optical narrow-band filter 3 reduces the spectrum width, broadening the time width of the pulse to such a region that approximation by a parabola in the expression (16) is impossible. Accordingly, the output waveform shown at (a) has no chirp while the output waveforms shown at (b) and (c) have a third-order or higher-order frequency chirp. The output waveform of the narrow-band filter can be improved and the compression ratio can be enhanced further by increasing the accuracy of approximation of the phase modulation characteristics. This means that an optical pulse compressor having the same configuration can implement a desired pulse compression ratio by using a narrow-band filter having a variable bandwidth.

Pulse compression using a Fourier transform of the present invention will be compared with the conventional pulse compressor using a fiber and a pair of diffraction gratings. The compressor including a fiber and a pair of diffraction gratings can be modeled by a combination of an optical phase modulator having phase modulation characteristics exp(iKt$^2$/2) (chirped by normal dispersion and self-phase modulation)

and a dispersive medium having a dispersion amount D (anomalous dispersion). The dispersion amount D given here is an amount of dispersion required to cancel out the chirp by phase modulation. If the Gaussian input u(t) is $A\exp(-t^2/2T_0^2)$, the dispersion amount D required to cancel out the chirp by phase modulation $\exp(iKt^2/2)$ is obtained as described below. The phase-modulated pulse u'(t) is expressed as follows:

$$u'(t) = u(t)\exp(iKt^2/2)$$
$$= A\exp(-t^2/2T_0^2 + iKt^2/2)$$

The waveform change v(t) caused by the dispersion amount D is derived from the expression (1) as follows:

$$v(t) = \frac{1}{\sqrt{2\pi iD}} \int_{-\infty}^{\infty} u'(t')\exp\left(-\frac{1}{2D}(t-t')^2\right)dt'$$
$$= \frac{1}{\sqrt{2\pi iD}} \int_{-\infty}^{\infty} A\exp\left(-\frac{t'^2}{2T_0^2} + \frac{iKt'^2}{2}\right)\exp\left(-\frac{i}{2D}(t-t')^2\right)dt'$$
$$= \frac{A}{\sqrt{2\pi iD}}\sqrt{\frac{2\pi}{1/T_0^2 + i(1/D - K)}}\exp\left(-\frac{it^2}{2D} + \frac{t^2}{2D^2[1/T_0^2 + i(1/D - K)]}\right)$$

The exponential part can be divided into a real term and a phase term, as follows:

$$v(t) \propto \exp\left(-\frac{t^2}{2D^2T_0^2[1/T_0^4 + (1/D - K)^2]} - \frac{it^2}{2D^2}\left[D - \frac{1/D - K}{1/T_0^4 + (1/D - K)^2}\right]\right) \quad (17)$$

The phase term $$\exp\left(-\frac{it^2}{2D^2}\left[D - \frac{1/D - K}{1/T_0^4 + (1/D - K)^2}\right]\right) \quad (18)$$

including the chirp in the expression (17) becomes zero with D given by:

$$D - \frac{1/D - K}{1/T_0^4 + (1/D - K)^2} = 0 \text{ より } D = \frac{KT_0^4}{1 + K^2T_0^4} \quad (19)$$

The real part of v(t) is derived from the expressions (17) and (19), as follows:

$$\exp\left(-\frac{t^2}{2D^2T_0^2[1/T_0^4 + (1/D - K)^2]}\right) = \exp\left(-\frac{t^2}{2T_0^2}(1 + K^2T_0^4)\right) \quad (20)$$

The time width $T_1$ of a transform-limited Gaussian pulse $$V(t) \propto \exp(-t^2/2T_1^2)$$

obtained under the condition of the expression (19) equals $T_0/(1+K^2T_0^4)^{1/2}$, as derived from the expression (20). Therefore, the compression ratio is given by the following expression:

$$\frac{T_0}{T_1} = \sqrt{1 + K^2T_0^4} \quad (21)$$
$$\cong |K|T_0^2$$

where $K^2T_0^4 \gg 1$.

Figure 6:
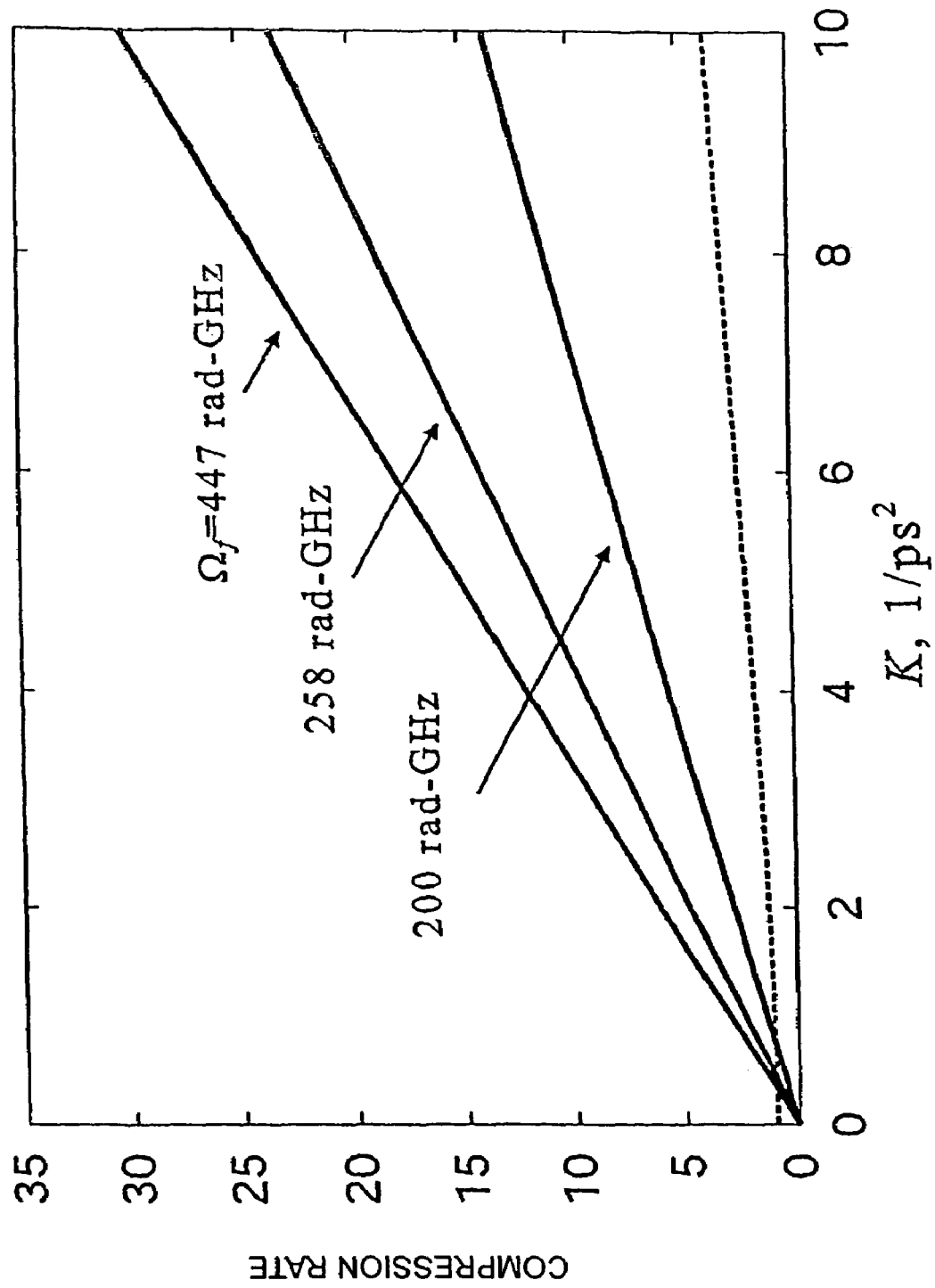
FIG. 6 is a view comparing the compression ratios of the optical pulse compressor according to the present invention (solid lines) with the compression rate of an optical pulse compressor using a fiber and a pair of diffraction gratings (broken line).

FIG. 6 shows a view comparing the compression ratio of the optical pulse. The figure compares the compression ratio of the optical pulse compressor according to the present invention (solid lines) with the compression ratio of an optical pulse compressor using a fiber and a pair of diffraction gratings (broken line). The figure also compares the relationship between the chirp rate and the pulse compression ratio of the pulse compressor using an optical Fourier transform given by the expressions (15) and (21) and the pulse compressor using a fiber and a pair of diffraction gratings. In the figure, $T_0$ is set to 0.6 ps, which corresponds to a full width at half maximum $T_{FWHM}$ of 1.0 ps. The compression ratio of the compressor using an optical Fourier transform is greater than the compression ratio of the compressor using a fiber and a pair of diffraction gratings at any |K|. The compression ratio increases as the bandwidth of the filter narrows. This can be explained as follows: The expressions (15) and (21) indicate that the compression ratio of any compression method is proportional to the magnitude |K| of the chirp rate when the pulse width $T_0$ is kept at a constant level. The proportionality factor of the compression ratio of the compressor using a fiber and a pair of diffraction gratings is given by $T_0^2$ in the expression (21). The proportionality factor of the compression ratio of the compressor using an optical Fourier transform depends on the bandwidth $\Omega_f$ of the filter and is expressed by $T_0/\Omega_f$, as derived from the expression (15). While $\Omega_f > 1/T_0$ (while the bandwidth of the filter is narrower than the spectrum width of the pulse), the compressor using an optical Fourier transform always provides a higher compression ratio and shows better compression characteristics than the compressor using a fiber and a pair of diffraction gratings.

The shaping of the time waveform of the optical pulse in the configuration shown in FIG. 2 will be described next in further detail. A desired time waveform depending on the function form of G(ω) can be generated by selecting appropriate frequency characteristics G(ω) of the optical filter 13, as indicated by the expression (6). It will be indicated here that a pulse train having a waveform expressed by a Hermite-Gaussian function can be generated when a Gaussian pulse is input and when the filter has amplitude characteristics expressed by a Hermitian polynomial expression $H_n(x)$.

A Hermite-Gaussian function $\psi_n(x)$ is defined by a Hermitian polynomial expression $H_n(x)$, as follows:

$$\psi_n(x) = \frac{1}{\sqrt{2^n n! \sqrt{\pi}}} H_n(x) \exp(-x^2/2) \quad (22)$$

The Hermitian polynomial expression $H_n(x)$ is a series of polynomials, defined as follows:

$$H_{n+1} - 2xH_n + 2nH_{n-1} = 0,\ H_0(x)=1,\ H_1(x)=2x \quad (23)$$

For instance, $H_2(x)=4x^2-2$. Because a Hermite-Gaussian function is expressed as the product of a Hermitian polynomial and a Gaussian function, the Hermite-Gaussian function can be obtained in the time domain by injecting a Gaussian optical pulse to an optical Fourier transform through a filter having frequency characteristics expressed by a Hermitian polynomial expression. The amplitude characteristics of the filter must satisfy just this condition (by the neglect of the normalization constant):

$$G(\omega) = H_n(T_0 \omega) \quad (24)$$

Figure 7:
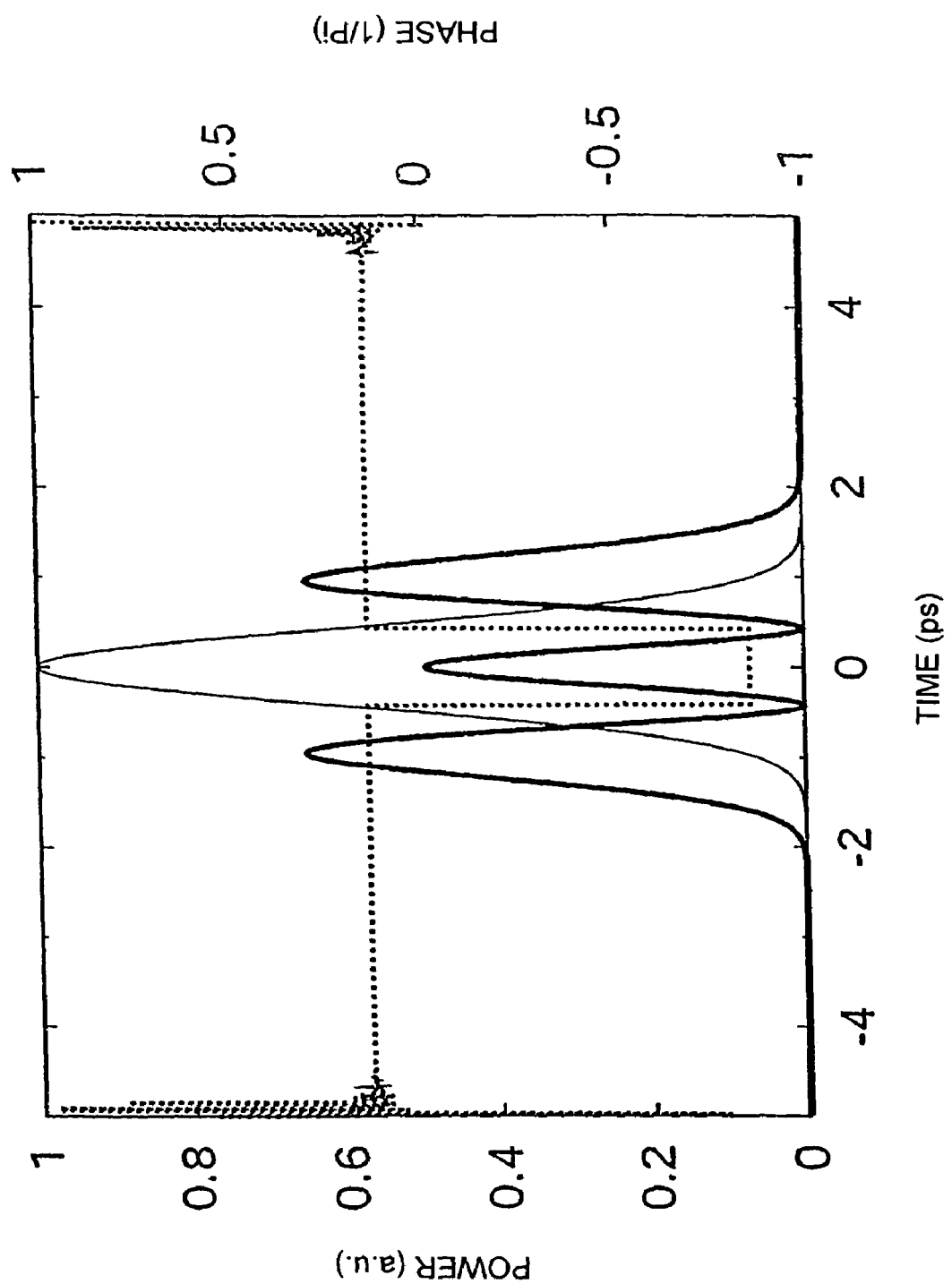
FIG. 7 is a view showing the input waveform, a Hermite-Gaussian waveform generated by the optical function generator, and its phase, in the first embodiment of the present invention.

FIG. 7 is a view showing the input waveform, the generated Hermite-Gaussian waveform, and its phase, of the optical function generator of the first embodiment of the present invention. The figure shows values obtained to indicate the effect of shaping by the optical function generator of the first embodiment, through calculation using the initial conditions given above with the optical Fourier transform circuit and considering the transfer function of the optical filter 13 to be a second-order Hermitian polynomial $H_2(T_0\omega)$. In the figure, a thin solid line represents the time waveform of the optical pulse at A in FIG. 2, a thick solid line represents the time waveform of the optical pulse at C in FIG. 2, and a broken line represents the phase of the output waveform at C in FIG. 2. The phase change in the vicinity of t=0 represents a phase inversion in the central part of the second-order Hermite-Gaussian function. A transform-limited second-order Hermite-Gaussian function can be output by using the optical filter 13 having frequency characteristics expressed by a second-order Hermitian polynomial $H_2(T_0\omega)$.

B. Second Embodiment

Figure 8:
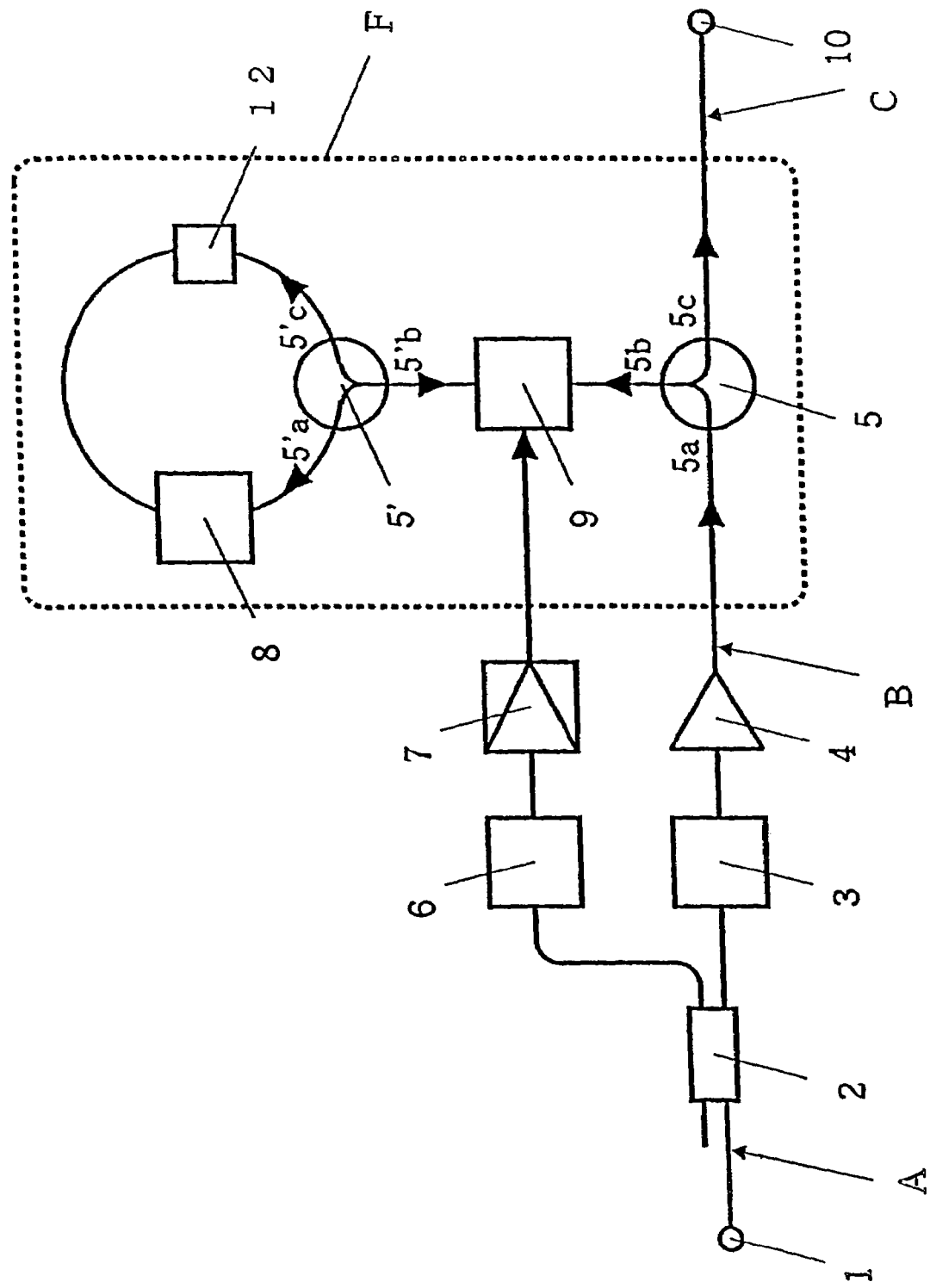
FIG. 8 is an illustrative view showing an optical pulse compressor of a second embodiment of the present invention.

FIG. 8 is a view showing the configuration of an optical pulse compressor of a second embodiment. The configuration shown in FIG. 8 differs from the configuration shown in FIG. 1 in the following points: a dispersive medium 8 and an optical phase modulator 9 in an optical Fourier transform circuit F are interchanged, and an optical delay element 12 is placed after the dispersive medium 8 in a loop connecting ports 5'*a* and 5'*c* of an optical circulator 5'. The drive circuit of the optical phase modulator 9 receives a clock signal reproduced by a clock extraction circuit 6 and an electric amplifier 7 from an optical coupler 2, as in FIG. 1.

Figure 9:
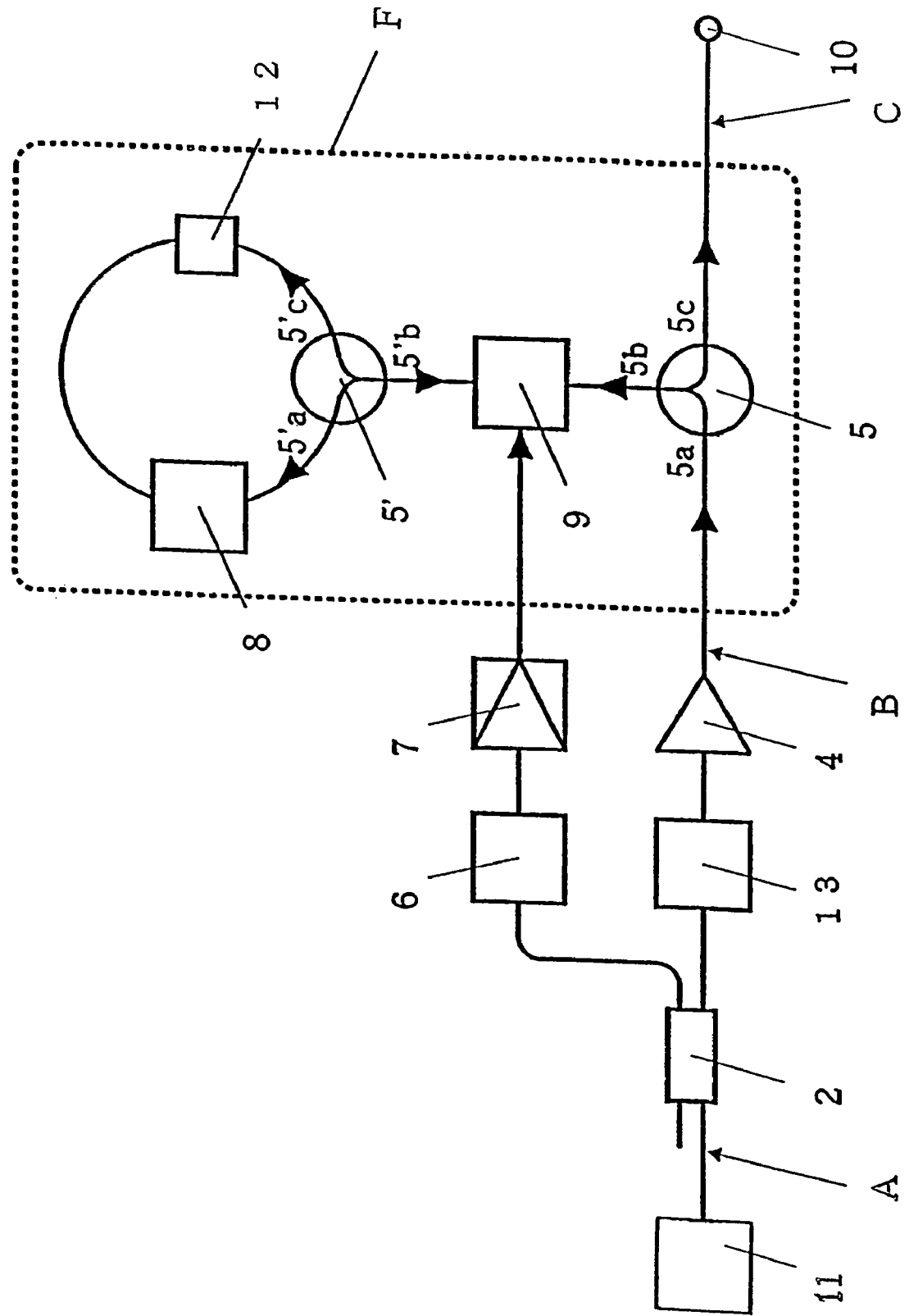
FIG. 9 is an illustrative view showing an optical function generator of the second embodiment of the present invention.

FIG. 9 is a view showing the configuration of an optical function generator of the second embodiment. The optical input terminal 1 of the optical pulse compressor of the second embodiment is replaced by an optical pulse generator 11, as in the first embodiment.

The operation of the optical pulse compressor and the optical function generator will be described next.

An optical pulse train is input to the optical input terminal 1 of the optical pulse compressor while the optical pulse generator 11 of the optical function generator generates an optical pulse train. The subsequent part of the operation is common to the optical pulse compressor and the optical function generator. The input optical pulse train passes through an optical coupler 2, and the clock signal of the optical pulse train is reproduced in advance by the clock extraction circuit 6 and the electric amplifier 7. The optical pulse train is then supplied to an optical narrow-band filter 3 in the optical pulse compressor or to an optical filter 13 in the optical function generator. The optical pulse train is amplified by an optical amplifier 4 having an appropriate gain for maintaining the same level of energy before and after the filter. The amplified optical pulse is supplied through ports 5*a* and 5*b* of an optical circulator 5 to the optical phase modulator 9. The optical pulse is linearly chirped by the optical phase modulator 9 driven at timing depending on the clock signal reproduced from the optical pulse train. Different frequency shifts are assigned to individual time positions of the optical pulse. The chirped optical pulse passes through the ports 5'*b* and 5'*a* of the optical circulator 5' and the dispersive medium 8. Different time delays are given to the time waveform of the optical pulse depending on the frequency shifts and different frequency components are separated in the time domain. When the dispersion amount D of the dispersive medium 8 is set to 1/K, where K is the chirp rate of the optical phase modulator 9, the Fourier transform image U(ω) of the time waveform u(t) at B in FIGS. 8 and 9 is generated in the time domain.

The relationship between the input pulse waveform u(t) and the output pulse waveform v(t) of the optical Fourier transform circuit F is obtained as described below. The time signal $u_-(t)$ after phase modulation of u(t) by the optical phase modulator 9 is given by the following expression, which is similar to the expression (2):

$$u_-(t) = u(t) \exp(iKt^2/2) \quad (25)$$

The pulse waveform $u_+(t)$ after the dispersive medium 8 following the optical phase modulator 9 is given by the following expression, which is similar to the expression (1), by using $u_-(t)$:

$$u_+(t) = \frac{1}{\sqrt{2\pi i D}} \int_{-\infty}^{\infty} u_-(t') \exp\left(-\frac{i}{2D}(t-t')^2\right) dt' \quad (26)$$

The expression (26) can be rewritten as follows with regard to u(t), by using the expression (25):

$$u_+(t) = \frac{1}{\sqrt{2\pi i D}} \int_{-\infty}^{\infty} u(t') \exp\left(\frac{iKt'^2}{2}\right) \exp\left(-\frac{i}{2D}(t-t')^2\right) dt' \quad (27)$$

If the dispersion amount D of the dispersive medium 8 is set to 1/K, the expression (27) can be rewritten as follows:

$$u_+(t) = \frac{1}{\sqrt{2\pi iD}} \exp\left(-\frac{iKt^2}{2}\right) \int_{-\infty}^{\infty} u(t') \exp\left(\frac{it}{D}t'\right) dt' \qquad (28)$$

$$= \frac{1}{\sqrt{2\pi iD}} \exp\left(-\frac{iKt^2}{2}\right) U(t/D)$$

where $U(\omega)$ [$\omega = t/D$] is a Fourier transform (expression (6)) of $u(t)$. The remaining chirp $\exp(-iKt^2/2)$ in the expression above can be eliminated by applying again a phase modulation of the same amount, $\exp(iKt^2/2)$, by the optical phase modulator 9. The pulse train is delayed by an appropriate amount by the optical delay element 12 and enters the optical phase modulator 9 again. The delay amount is specified so that the peak of the pulse coincides with the timing of the phase modulation characteristics of the optical phase modulator 9. After the remaining chirp is completely eliminated, the optical pulse expressed by:

$$v(t) = \frac{1}{\sqrt{2\pi iD}} U(t/D) \qquad (29)$$

is output through the ports 5b and 5c of the optical circulator 5 and the optical output terminal 10 to the outside.

Figure 10:
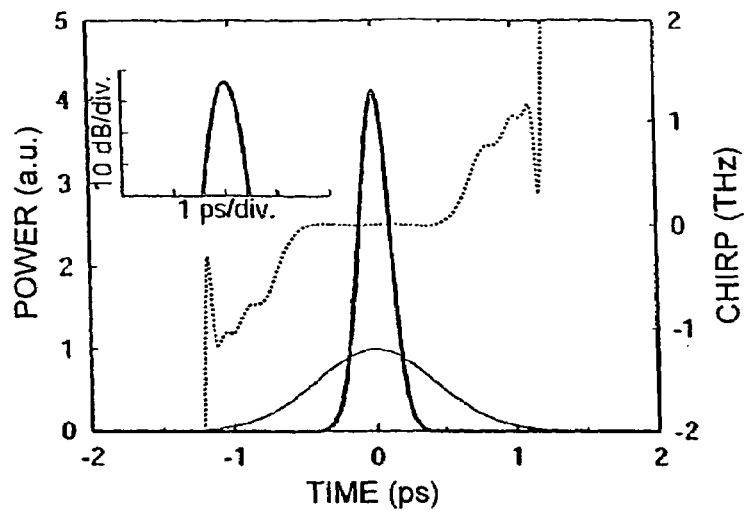
FIG. 10 is a view showing the time waveforms of the input pulse, the time waveforms of the compressed output pulse (solid lines), and the frequency chirp (broken line), of the optical pulse compressor of the second embodiment of the present invention.
Figure 10:
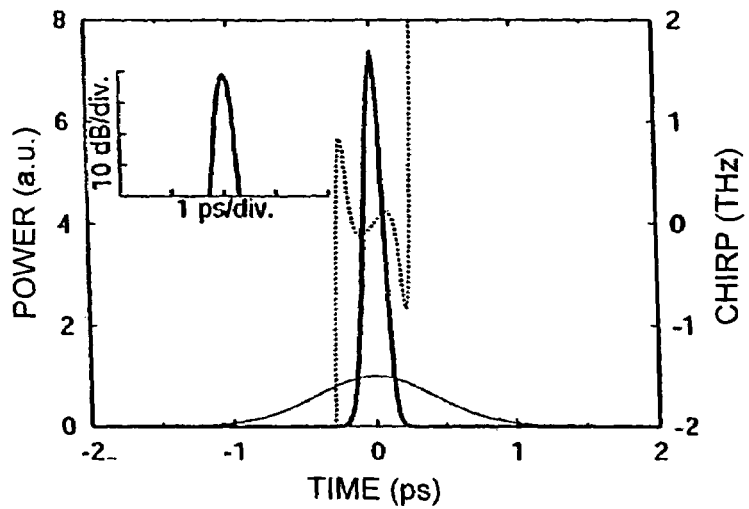
Figure 10:
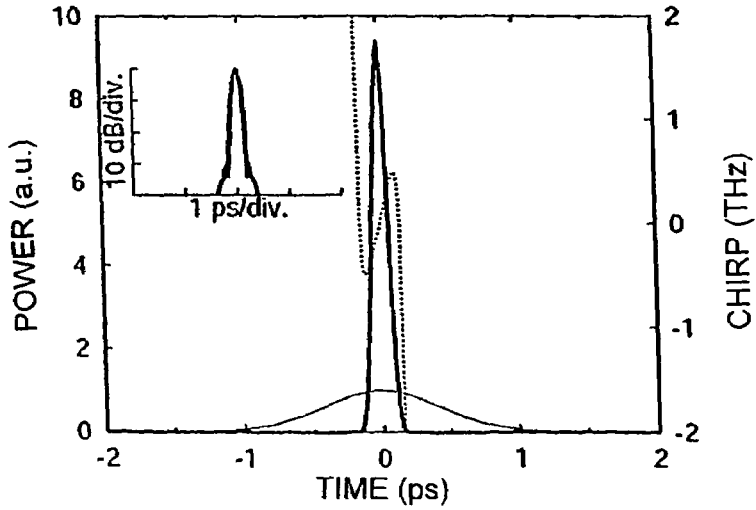

FIG. 10 is a view showing the time waveforms of the input pulse, the time waveforms of the compressed output pulse (solid lines), and the frequency chirp (broken line), of the optical pulse compressor of the second embodiment of the present invention. A solid line represents a time waveform, and a broken line represents a frequency chirp. An inserted view shows the time waveform of the output pulse on the dB scale. The figure shows values obtained to express the performance of pulse compression by the pulse compressor of the second embodiment, through calculation using the same parameters as in the calculation of pulse compression in the first embodiment. Like in FIG. 5, FIGS. 10(a), 10(b), and 10(c) are views taken when the bandwidth $\Omega_f$ of the filter is 447 rad-GHz, 258 rad-GHz, and 200 rad-GHz respectively. A thin solid line represents the time waveform at A in FIG. 8, a thick solid line represents the time waveform at C in FIG. 8, and a broken line represents the frequency chirp of the output waveform at C in FIG. 8. The inset shows the output time waveform at C in FIG. 8, using a logarithm scale as the vertical axis. The compression ratios at (a), (b), and (c) are 3.86, 6.41, and 7.69 respectively, which are large like the compression ratios obtained in FIG. 5. The time bandwidth products, TBPs, of the output pulse are 0.441, 0.450, and 0.482 respectively, which are slightly better than the results obtained in FIG. 5.

INDUSTRIAL APPLICABILITY

According to the present invention, a compact, highly-functional optical pulse compressor that can generate a train of low-power, high-repetition-frequency ultrashort pulses for use in ultra-high speed optical communication or optical measurement and a simple-structure optical function generator that can implement a desired time waveform can be provided.

With an optical pulse compressor and optical pulse compression method of the present invention, ultra-high-speed, ultrashort pulses can be generated over a wide range of input power and pulse width by a compact, simple configuration. A single apparatus according to the present invention can provide different pulse compression ratios, by using a narrow-band filter having a variable bandwidth, so that flexibility can be given to the configuration of an optical pulse compressor and an optical pulse compression method.

With an optical function generator and optical function generation method of the present invention, a pulse having a desired time waveform depending on the form of the transfer function of a frequency filter can be generated easily by designing the amplitude characteristics and the phase characteristics of the frequency filter appropriately. The present invention can provide an optical function generator and an optical function generation method that can find a wide range of uses such as signal pulses for ultrahigh-speed time-division multiplexed optical transmission and sampling pulses in ultrahigh-speed measurement, by obtaining ultrashort pulses with a pulse width of several hundreds of femtoseconds or a pulse train having a desired time waveform such as Gaussian, Hermite-Gaussian, and rectangular.

The invention claimed is:

1. An optical function generator comprising:
    an optical pulse generator for generating an optical pulse train;
    an optical Fourier transform circuit for converting the shape of the frequency spectrum of the optical pulse input from the optical pulse generator to a time waveform, the optical Fourier transform circuit having an optical phase modulator driven at the repetition frequency of the input optical pulse train from the optical pulse generator and a dispersive medium; and
    an optical filter for shaping the spectrum of the input optical pulse and determining the time waveform of the output optical pulse in accordance with frequency characteristics, the optical filter being inserted before the optical Fourier transform circuit,
    wherein the optical Fourier transform circuit generates an optical pulse having a desired time waveform depending on the function form of the frequency characteristics of the optical filter, by reproducing, directly in the time domain, the spectrum shaped as desired by the optical filter.

2. An optical function generator according the claim 1, wherein a Fourier-transform-limited pulse is used as the input optical pulse.

3. An optical function generator according to claim 1, wherein the optical phase modulator is driven at a clock frequency reproduced from the input optical pulse train, and linearly chirps the input optical pulse; and the dispersive medium gives group-velocity dispersion.

4. An optical function generator according to claim 1, wherein, in the optical Fourier transform circuit,
    the dispersive medium gives group-velocity dispersion to the optical pulse output from the optical filter;
    the optical phase modulator is driven at a clock frequency reproduced from the input optical pulse train, and linearly chirps the optical pulse output from the dispersive medium; and
    the dispersive medium receives the optical pulse output from the optical phase modulator, gives group-velocity dispersion again, and compensates for the remaining chirp.

5. An optical function generator according to claim 1, wherein, in the optical Fourier transform circuit,
    the optical phase modulator is driven at a clock frequency reproduced from the input optical pulse train, and linearly chirps the optical pulse output from the optical filter;

the dispersive medium gives group-velocity dispersion to the optical pulse output from the optical phase modulator; and the optical phase modulator receives the optical pulse output from the dispersive medium, gives another linear chirp, and compensates for the remaining chirp.

6. An optical function generator according to claim 1, wherein the chirp rate K of phase modulation by the phase modulator and the group-velocity dispersion D of the dispersive medium satisfy a relationship of K=1/D.

7. An optical function generation method using an optical function generator comprising an optical pulse generator, an optical Fourier transform circuit, and an optical filter, the optical Fourier transform circuit having an optical phase modulator and a dispersive medium, the optical function generation method including:

shaping the spectrum of an input optical pulse from the optical pulse generator, and determining the time waveform of the output optical pulse in accordance with frequency characteristics, by inserting the optical filter before the optical Fourier transform circuit;

driving the optical phase modulator at the repetition frequency of the input optical pulse train; and generating an optical pulse having a desired time waveform, depending on the function form of the frequency characteristics of the optical filter, by reproducing, directly in the time domain, the spectrum shaped as desired by the optical filter, by means of the optical Fourier transform circuit.

* * * * *